July 7, 1925.

O. MORIN 1,545,346

HOISTING AND WEIGHING APPARATUS

Filed Feb. 5, 1923    4 Sheets-Sheet 1

Inventor
Otilio Morin.
By B. Sniger
Atty.

July 7, 1925.
O. MORIN
1,545,346
HOISTING AND WEIGHING APPARATUS
Filed Feb. 5, 1923     4 Sheets-Sheet 2
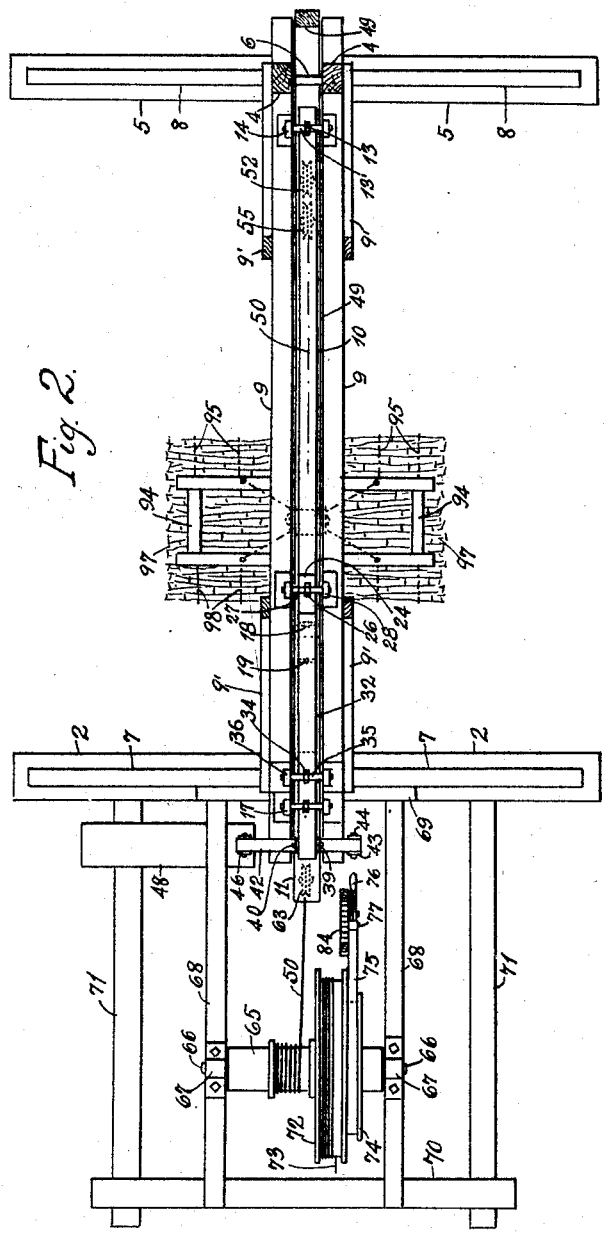

July 7, 1925.
O. MORIN
1,545,346
HOISTING AND WEIGHING APPARATUS
Filed Feb. 5, 1923 4 Sheets-Sheet 3
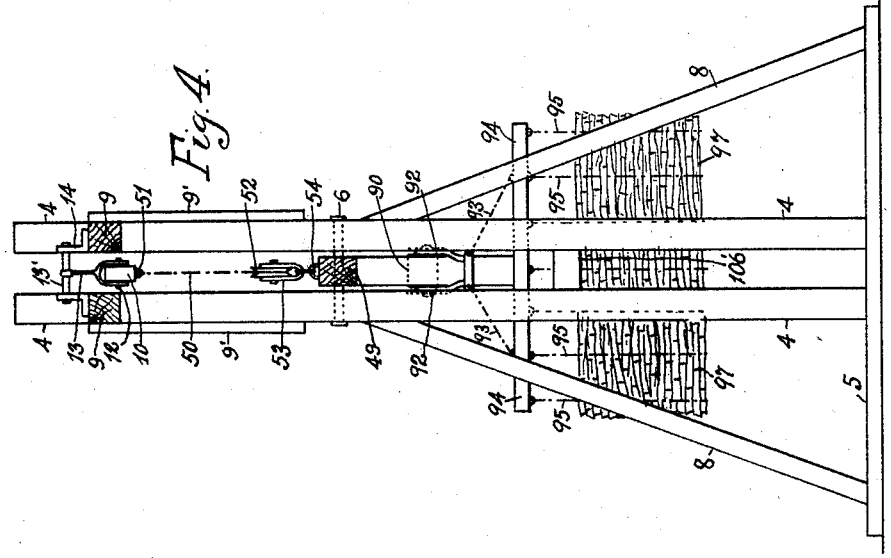
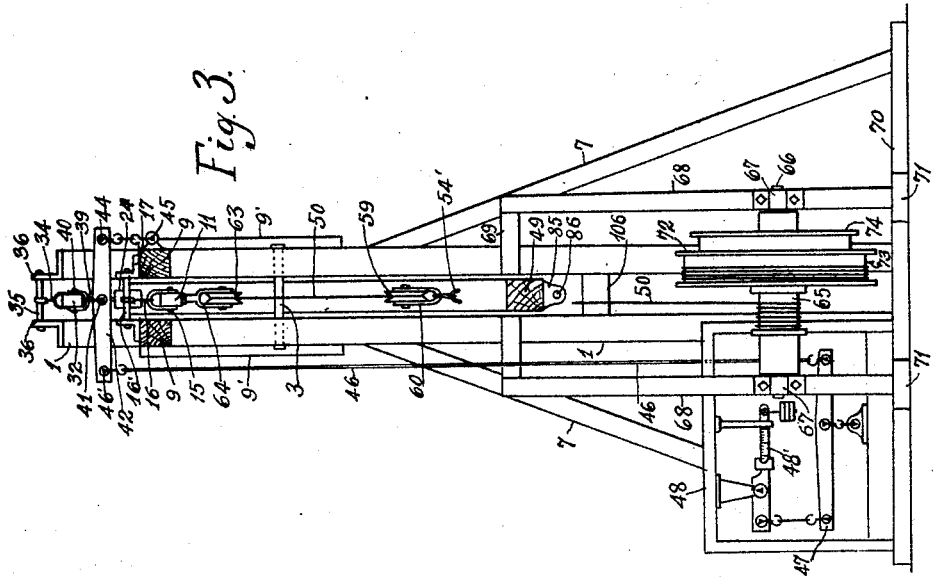
Inventor
Otilio Morin,
By B. Singer, Atty.

July 7, 1925.
O. MORIN
1,545,346
HOISTING AND WEIGHING APPARATUS
Filed Feb. 5, 1923
4 Sheets-Sheet 4
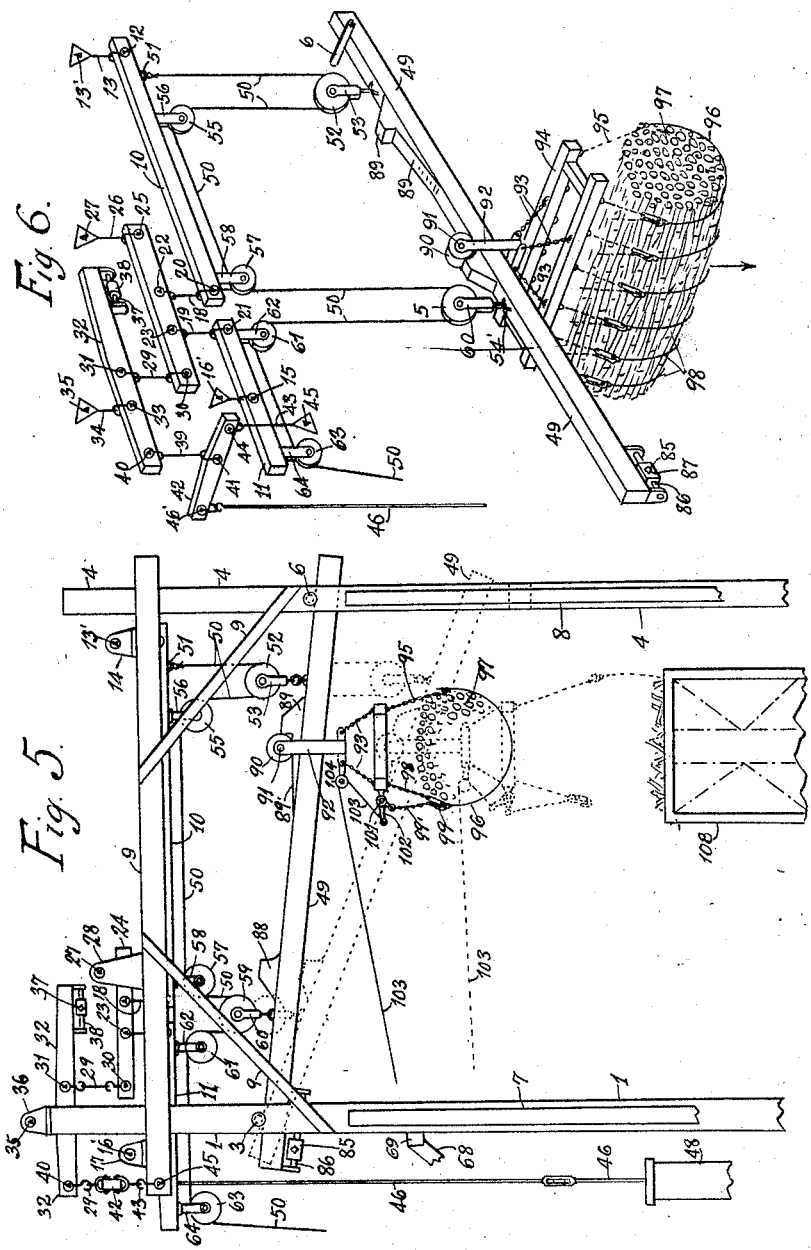

Patented July 7, 1925.

UNITED STATES PATENT OFFICE.

OTILIO MORIN, OF PALOS, CUBA.

HOISTING AND WEIGHING APPARATUS.

Application filed February 5, 1923. Serial No. 617,148.

*To all whom it may concern:*

Be it known that I, OTILIO MORIN, a citizen of the Republic of Cuba, and resident of Palos, Province of Habana, Cuba, have invented certain new and useful Improvements in Hoisting and Weighing Apparatus, of which the following is a specification.

This invention relates to improvements in apparatus for hoisting and weighing loads, particularly in apparatus used for transferring sugar cane from the carts to the railroad cars in the sugar plants and its object is to provide an improved apparatus of that class which at the same time that it effects the transfer of the sugar cane, takes its weight at any point of its travel, with the particularity that in the same is eliminated the stationary inclined track on which travels the carrier from which usually hangs the frame holding the load through a suspension member, the carrier being substituted by a trolley from which hangs the frame holding the load without the intermediation of a suspension cable or chain, and which trolley runs by gravity on a beam or proper transferring member which is capable of taking different positions at different heights and at different opposite inclinations for the operations of hoisting, transporting and discharging the load, this beam being suspended from a system of levers mounted at even balance in the same frame of the apparatus and connected to the weighing beam of a weighing scale, thereby largely simplifying the construction of the weighing and transferring apparatus and the motions of the load being rendered more easy, the weighing operation being thus facilitated.

The invention is described with reference to the figures of the annexed drawing, in which:

Fig. 2 is an upper plan view of the same.

Fig. 3 is an end elevation of the apparatus.

Fig. 4 is an opposite end elevation of the apparatus.

Fig. 5 is a partial side elevation of the apparatus showing a different position to that illustrated in Fig. 1.

Figure 1:
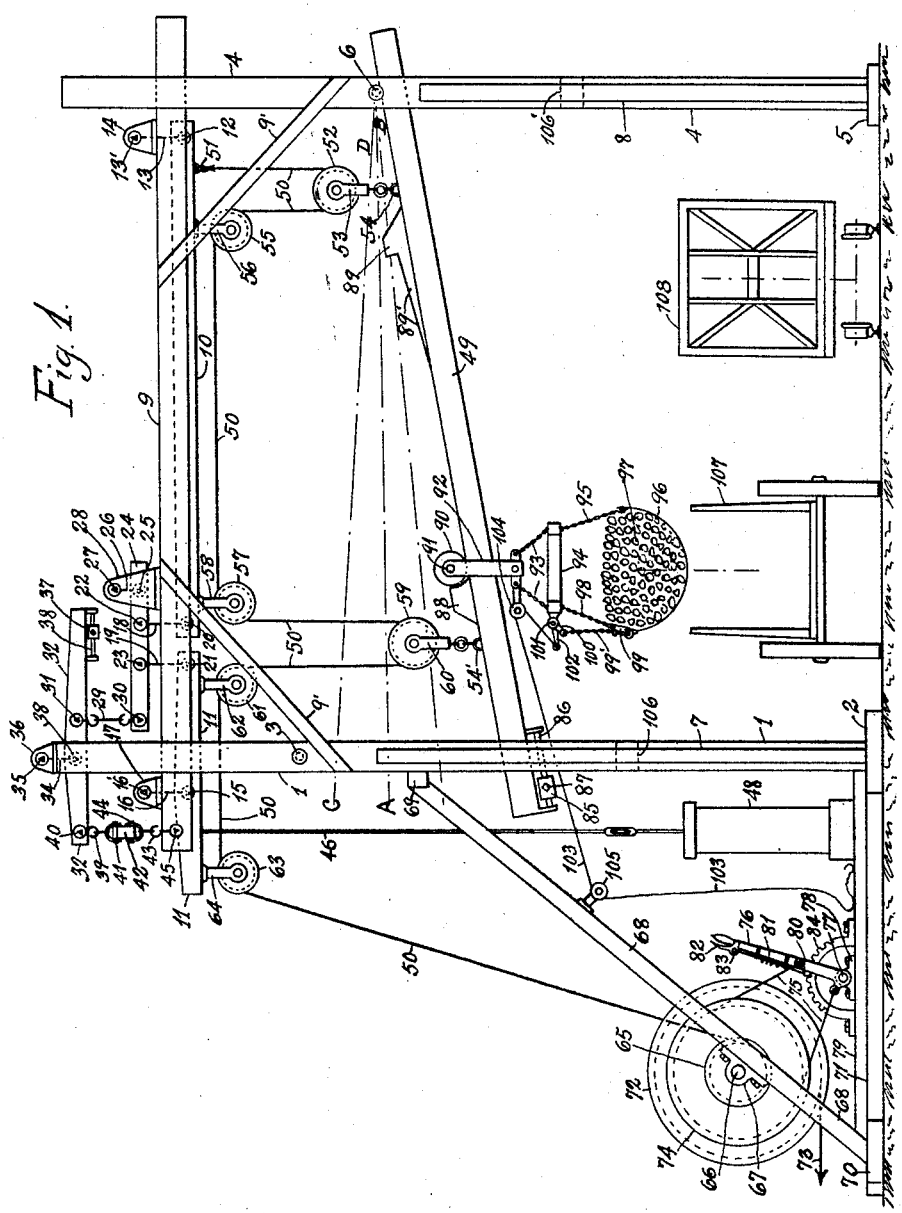
Fig. 1 is a side elevation of the hoisting and weighing apparatus forming the subject matter of this invention.

And Fig. 6 is a perspective view of the transferring beam and of the system of weighing levers constituting the apparatus.

This hoisting apparatus comprises a frame which is composed of two standards 1 at one end which are supported on a girder 2 and connected by a transverse bolt 3 at a certain height, and two standards 4 at the other end which are supported on a girder 5 and connected by a transverse bolt 6 located at a lower level than bolt 3 with the object that will be hereinafter explained, the standards 1 being reinforced by side stays 7 and the standards 4 by side stays 8. The standards 4 are of the same height as the standards 1, and each standard 1 is connected with one of the standards 4 by a bolster 9 substantially horizontal and suitably spliced so that the bolsters 9 may project somewhat beyond the standards 1 and 4 and these may project somewhat above the bolsters 9. The bolsters 9 are reinforced by braces 9'. The bolsters 9 are spaced apart from each other a distance slightly in excess of the width of the beam that will be hereinafter described, and between them is mounted, at even balance, a system of levers in the following manner. Directly between the bolsters 9 are mounted two levers of second class 10 and 11 in substantial horizontal position on the same level, of which levers the lever 10 is the longer and bears near the standards 4 through knife trunnions 12 in side hooks forming a lower extension of a clamp rod 13 which through another upper central hook hangs from a cross horizontal balance knife 13' supported on two supporting angle plates 14 fixed on the upper faces of bolsters 9. Lever 11 bears near the left projecting end of bolsters 9 on knife trunnions 15 in side hooks from which depends a clamp rod 16 which through another upper central hook hangs from a cross horizontal balance knife 16' supported on two supporting angle plates 17 fixed on the upper faces of bolsters 9. The levers 10 and 11 are connected at their inner ends near to each other by double clamp rods 18 and 19 mounted through end hooks, two at the bottom and two at the top, on knife trunnions 20 and 21 projecting from the sides of said levers and trunnions 22 and 23 which project from intermediate points of a third short arm lever 24. Said lever bears above the bolsters 9 and through knife trunnions 25 in side hooks from which depends a clamp suspension rod 26 which through another upper central hook hangs from a transverse horizontal balance knife 27 supported on two supporting angle plates 28 fixed on the upper faces of bolsters 9. Said lever 24 is above and in vertical alignment with the ends of levers 10 and 11. Said lever 24 is also connected at its other end to a lever 32 by a double clamp rod 29 mounted through end hooks on knife trunnions 30 and 31 which projects from the sides of lever 24, and of a middle point in the length of the fourth lever 32, which is of the first class and bears above the lever 24. Lever 32 is mounted on knife trunnions 33 which are suspended by a hook 34 from trunnions 35 which bear at 36 on the upper ends of standards 1. This fourth lever 32 carries at its inner end a counterweight 37 which slides on a guide 38 fixed below said lever, and this same lever 32 is connected at its outer end with a double clamp rod 39 mounted through end hooks on knife trunnions 40 and 41 respectively. Said knife trunnions 40 and 41 project from the sides of this fourth lever and from a point midway the length of a fifth lever 42 which is of the second class and is arranged in transverse relation to the frame of the apparatus and above the corresponding end of the bolsters 9 at a level about the same as the lever 24. Said lever 42 is connected at one end with a double clamp rod 43 mounted through end hooks on knife trunnions 44 and 45 which respectively project from the sides of an end of this fifth lever and from the sides of the adjacent projecting end of one of the bolsters 9. The other end of this lever 42 is connected through a tie-rod 46 mounted through hooks on the knife trunnions 46' which project from the sides of said lever 42, with the lever arm 47 of a weigh scale 48 arranged on the ground outside the standards 1. I provide a weighing beam 48' to receive the tension strength transmitted through the system of levers described, as will be hereinafter explained.

Between both standards 1 and between both standards 4 is suspended a transferring beam 49 which has an ascending and descending motion and also a tilting motion in opposite directions, by means of a hoisting cable 50. This cable 50 has an end tied to an eye bolt 51 fixed near the standards 4 at the lower face of lever 10, but more to the inside thereof than fulcrum point. Said cable 50 passes under a sheave 52 which is connected at 53 to the beam 49. Said cable 50 then leads up to pass above sheave 55 whose supporting clamp 56 is fixed below the inner face 10 and near the eye bolt 51. Said cable 50 then passes below the lever 10 to pass above another sheave 57 whose supporting clamp 58 is fixed below the inner face of lever 10 near the opposite end thereof. Said cable 50 then passes under a sheave 59 which is connected at 60 to the beam 49 near the standards 1 and vertically corresponding to the separation between the two levers 10 and 11. Said cable then passes above the sheave 61 whose supporting clamp depends from one end of the lever 11, and said cable 50 also passes over the sheave 63 whose supporting clamp 64 depends from the other end of said lever 11. Said cable 50 leads down to be wound on a drum 65 whose horizontal shaft 66 is mounted on bearings 67 fixed on oblique braces 68 which at their upper end are fixed to a cross bar 69 secured to the standards 1 and at their lower end rest on a transverse girder 70 connected through longitudinal girders 71 with girder 2. To said drum 65 is rigidly connected a large wheel 72 on which is wound the cable 73 to be pulled by oxen, there being annexed to said wheel a sheave 74 on whose periphery is mounted the clutch band 75 whose ends are connected to different points of the hand lever 76 pivoted at 77 to bearings 78 fixed on a supporting base 79 on the ground. On said lever 76 is slidably mounted the catch rod 80 actuated by a coil spring 81 surrounding the same and connected to a handle 82 pivoted at 83 on the handle of said lever 76. The catch 80 is designed to engage one of the teeth of gear sector 84 fixed on the supporting base 79 at a side of bearings 78.

The transferring beam 49 is provided underneath its lower face and on the end which is in front of the driving means 65 and 72 with a counterweight 85 which is slidably controlled on a supporting guide 86 fixed to said beam 49, by means of a set screw 87. On the upper side of said beam 49 are fixed stops 88 and 89 the latter of which has a sloping extension 89'. The beam 49 forms between said stops a track or guide member for a trolley wheel 90 from whose shaft 91 depends a frame 92 from which is suspended through chains 93 the frame 94. Chains 95 hang from the frame 94, and are hooked to the slings 96 holding the load of cane 97, and from the other side of said frame 94 hang the chains 98 carrying the sling releasers 99 which are actuated by the releasing chains 99' connected to arms 100 of a releasing bar 101. Said bar 101 is rotatably mounted on the outer side of frame 94 and carries a central arm 102 to which is laced the releasing cord 103 which is guided around sheaves 104 and 105 respectively supported on a side of the frame 92. The transverse bolts 3 and 6 serve to limit the upward movement of the beam 49. Moreover, the lower positions of the beam 40 are limited by a cross bar 106 connected to the standards 1 and by a cross bar 106' connected to the standards 4.

The operation of the apparatus is as follows: Assuming the load of cane 97 on cart 107 is properly slung, the transferring beam 49 is lowered to the lowermost position in the cart by inclining the same towards the latter by loosening the suspension cable 50, by properly operating the lever 76 of the clutch band 75 until the slings 96 are hooked with the chains 95 and with the releasers 99. The cable 73 is then pulled and the cable 50 will wind on the drum 65 thereby lifting the beam 49 at the end which bears the weight 85. Said beam 49 takes successively the positions indicated by dotted lines in Fig. 1 of the drawings, but on passing said beam beyond the horizontal position A—B it inclines towards the other end as indicated by dotted lines C—D, owing to the gravity force. The trolley 90 runs on the beam 49 from the top 88 to top 89 and goes up the slope 89' of the same. The weight of the load aids in taking the position indicated in dotted lines in Fig. 5 of the drawings, in which position the load of cane comes as near as possible to the floor of the wagon 108 and is discharged therein by pulling the releasing cord 103 which releases the releasers 99 through the medium of the rotatable bar 101. During such interval, that is, when the load of cane 97 has been freely suspended in the air from the transferring beam 49, the tension strength exerted on the hoisting cable 50 has caused its levers 10 and 11 to oscillate on their fulcrum points and transmitted at the same time such strength to the lever of the second class 24, which in turn transmits same to the lever 32 of the first class. Said lever 32 rocks very slightly and transmits the same strength to the transverse lever of second class 42 which transmits the strength through rod 46 to the lever 47 of the weighing scale 48 and to the scale beam 48' which marks the weight of said load of cane 97. Once the load has been discharged into the wagon 108, by releasing the clutch band 75, the beam 49 and the system of sheaves which guide the hoisting cable 50 are subjected to the free action of the counterweight 85 which is great enough to cause the beam to descend without load at the end corresponding to said counterweight. Said free action also causes the beam 49 to ascend at the opposite end, whereby when commencing the inclination towards the first end, the trolley 90 slides freely by gravity from the top 89 to stop 88, resuming the position indicated by full lines in Fig. 1. The apparatus is then ready for taking and hoisting another load of cane, the described operation being repeated.

It is obvious that the details of construction of the transferring beam and of the system of levers from which it is suspended and which transmit the action of the weight to the weighing scale 46, can vary without altering the spirit of the invention which is as set forth in the appended claims.

What I claim is:

1. A hoisting and weighing apparatus comprising an elevated frame, a system of levers mounted at even balance at the higher part of the frame, a weighing scale, means connecting the same to the levers, a guide member, a cable by which said guide member is suspended from said system of levers, sheaves on which said cable is guided, a drum on which said cable is wound, driving means for said drum, and sliding means on said guide member for receiving and discharging the load.

2. Hoisting and weighing apparatus comprising an elevated frame, a system of levers mounted at even balance at the upper part of the frame, a weighing scale, means connecting the same to the levers, a guide member, a cable by which said guide member is suspended from said system of levers at two opposite points, a system of sheaves on which said cable is guided, a counterweight at one end of said guide member, a drum on which said cable is wound, friction means on the drum, driving means for the drum, and sliding means on said guide member between its suspension points for receiving and discharging the load.

3. Hoisting and weighing apparatus comprising an elevated frame, a system of levers mounted at even balance at the upper part of the frame, a weighing scale in the lower part of the frame, means connecting said scale to said levers, a guide member, a cable by which said guide member is suspended from two different levers at two opposite end points, said cable being connected to one of said levers, a system of sheaves on which said cable is guided, a counterweight at one end of the guide member, a drum on which said cable is wound, friction means on the drum, driving means for the drum, sliding means on the guide member for carrying the frame holding the load and stops on said guide member in points located more to the inside than the suspension points, for limiting the position of said sliding means.

4. Hoisting and weighing apparatus comprising an elevated frame, a system of levers mounted at even balance on the upper part of the frame, a weighing scale, means connecting said scale to said levers, a longitudinal beam, a cable suspending said beam at points near its ends from two different lower levers of said system, said cable having one end fixed to one of said two levers, a system of guiding sheaves for said cable, certain of said sheaves being connected to said beam and others to the lower levers of the said system of levers, a drum on which the said cable is wound, friction means on the drum, driving means for the drum, a counterweight on the end of said beam near the drum, a trolley slidably arranged on said beam between the suspension points thereof, a load holding frame carried by the trolley, and stops on the guide in points located more to the inside than the suspension points of the same to limit the position of the trolley.

5. Hoisting and weighing apparatus comprising an elevated frame, a system of levers mounted at even balance at the upper part of the frame, a weighing scale, means connecting said scale to said levers, a longitudinal beam, a cable by which said beam is suspended at points near its ends from two of the said system of levers which are arranged below the others, a system of sheaves by which said cable is guided, two of said sheaves being connected to the suspension points of the beam and two of the other sheaves being connected to each one of the lower levers of the system, said cable having one end fixed to an end of one of the levers, a drum on which said cable is wound, friction means on the drum, driving means on the drum, a counterweight carried on the end of the beam nearer the drum, a trolley slidable on the beam between its suspension points, a load holding frame carried by the trolley, stops for the trolley on the beam arranged more to the inside than the suspension points of the same, and stops on the elevated frame for limiting the upward movement of the two ends of the beam.

In witness whereof I affix my signature.

OTILIO MORIN.